Feb. 26, 1924.
R. H. KIMBERLIN
WEEDING TOOL
Filed March 29, 1922
1,484,948
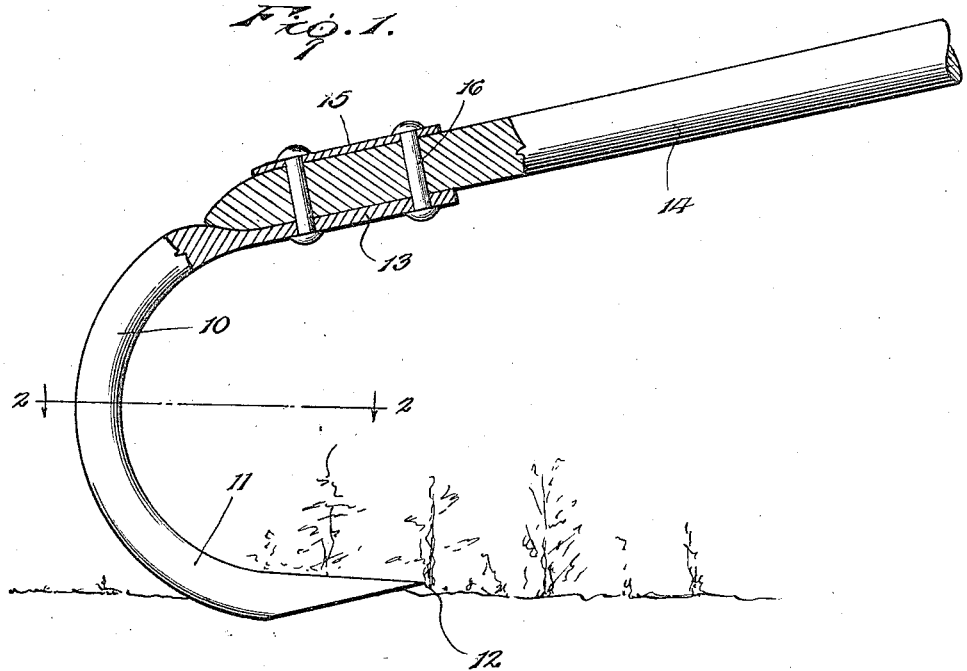
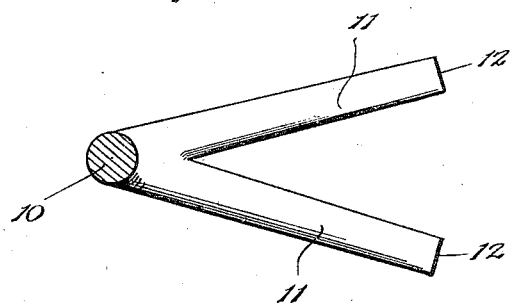
Inventor
R. H. Kimberlin.
By Lacy & Lacy, Attorneys Patented Feb. 26, 1924.

1,484,948

UNITED STATES PATENT OFFICE.

ROBERT H. KIMBERLIN, OF MIDLAND, SOUTH DAKOTA.

WEEDING TOOL.

Application filed March 29, 1922. Serial No. 547,816.

*To all whom it may concern:*

Be it known that I, ROBERT H. KIMBERLIN, a citizen of the United States, residing at Midland, in the county of Haakon and State of South Dakota, have invented certain new and useful Improvements in Weeding Tools, of which the following is a specification.

My invention relates to an implement for use in a garden for removing weeds or pulling up other vegetation such as bean and pea plants and the like, and one object of the invention is to construct the implement in such a manner, that it will materially assist, not only in loosening the soil around the plant, but also in the actual removal of the latter.

Another object of the invention is to provide a strongly built tool at a low cost, so that it may be within reach of a wide range of users.

In the accompanying drawing one embodiment of the invention is illustrated; and

Figure 1 shows the implement in elevation and partial section; and

Figure 2 is a section along line 2—2 of Figure 1.

The implement consists of a metallic rod 10, which is preferably bent in a semi-circle terminating at one end with a pair of fingers 11. These fingers are tapered inwardly as seen in Figure 1 to form knife edges 12 which are both situated in the same plane running approximately parallel with the axis of the semi-circle.

The other end of the rod is flattened as at 13 to accommodate a handle 14 made of wood or any other suitable material and a short plate 15 is provided on the opposite side of the handle to form a reinforcement thereof and to receive the heads of rivets 16 or other suitable securing means to hold the tool on the handle.

I have found that a practical size of the tool is to make it out of a rod about nine inches long with fingers 11 about three inches in length and spread apart about one inch. This gives a good grip around the plant to be removed as it becomes wedged between the fingers 11, when the implement is applied around its roots in the soil.

I reserve the right of making minor changes within the scope of this specification and the claim.

The use of the implement will now be readily understood. By gripping the handle with both hands and then making a chopping action with the tool on the ground in the vicinity of the plant or weed to be removed, the soil will be loosened sufficiently around the roots thereof to permit the insertion of the tapered fingers of the tool under the roots. By thereupon pushing the fingers in until the plant is gripped between them at the bottom of the V and jerking the end of the handle upwards, the plant will easily come out of the ground.

Having thus described the invention, what is claimed as new is:

An agricultural implement comprising an arcuate rod having its upper end flattened to form a seat and its lower end terminating in diverging fingers, said fingers each tapering to a knife edge, and a handle secured rigidly upon the seat at the upper end of the rod.

In testimony whereof I affix my signature.

ROBERT H. KIMBERLIN. [L. S.]